May 19, 1970     W. HONMANN     3,512,578
AIR CONDITIONER

Filed July 19, 1968     2 Sheets-Sheet 1

Inventor:
WINFRIED HONMANN

By Michael S. Seuler
Attorney

United States Patent Office 3,512,578
Patented May 19, 1970

3,512,578
AIR CONDITIONER
Winfried Honmann, Stuttgart-Feuerbach, Germany, assignor to LTG Lufttechnisch Gesellschaft mit beschrankter Haftung, Stuttgart, Germany
Filed July 19, 1968, Ser. No. 746,122
Claims priority, application Germany, Aug. 24, 1967,
L 57,290
Int. Cl. F25b 29/00
U.S. Cl. 165—26                     19 Claims

ABSTRACT OF THE DISCLOSURE

An air conditioner comprises a housing which defines an internal chamber having at least two inlets and an outlet for air. One cooling device is located in the path of air entering through one of the inlets and one heating device is located in the path of air entering through the other of the inlets. First and second throttling means are respectively associated with the inlets and operative for permitting and preventing airflow through the respective inlets. Operating means includes a first and a second component which are shiftable relative to each other and associated with the throttling means in such a way that shifting of each component controls movement of one of the throttling means between the open and closed positions thereof while maintaining the upper throttling means in a position corresponding to that towards which the one throttling means is being moved.

Background of the invention

The present invention relates to an air conditioner in general and more particularly to an air conditioner provided with independent heating means and cooling means.

It is of course known to provide air conditioners with heat exchange means capable, in dependence upon the will of a user or upon automatic controls, of effecting heating or cooling of air. It is also known to provide air conditioners where not a single heat exchange means is being used for the two functions, but different and separate heat exchange means are being used for respectively heating and cooling the air. These latter types of air conditioners have various advantages over the former, including the fact that there are caloric exchange losses and that the air temperature, particularly where the intermediate stage of transition from heating to cooling or vice versa is concerned, can be more effectively regulated.

In the latter type of air conditioner it is known to vary the cross-sectional area of the air inlets communicating respectively with the heating and cooling device, and thereby throttle the airflow passing over or through the respective heat exchange device, by means of turnable flaps or similar valve members which are individually adjusted by individual electromotors or analogous means. It is also known to effect adjustment of the various flaps via a single motor or the like, in which case their adjustment is effected in sequence by utilizing suitably configurated cams. However, in both instances the constructions are relatively complicated and, therefore, are necessarily subject to mechanical difficulties. Furthermore, over a period of time and as a result of increasing bearing play and/or wear of materials, overlapping of the operation of the various flaps may occur, leading to significant heat-exchange losses because of undesired and/or excessive admixture of heated air with cooled air.

For all of these reasons, it is a general object of the present invention to overcome the aforementioned disadvantages.

A more particular object of the invention is to provide an improved air conditioner here under discussion.

It is a further object of the invention to provide such an air conditioner whose construction is simple and relatively inexpensive and in which the controls are so effected as to provide a high degree of assurance against malfunctions of the type discussed above.

An additional object of the invention is to provide such an air conditioner, particularly of the induced-airflow type, in which overlapping of the heating and cooling functions is reliably prevented.

Summary of the invention

In accordance with one feature of my invention I provide an air conditioner of the type under discussion which includes housing means defining an internal chamber and having at least two inlets and an outlet which communicates with the chamber. Air to be conditioned can respectively enter the chamber through the inlets and leave the chamber through the outlet. Heat exchange means includes at least one cooling device and at least one heating device each of which is arranged in the path of air entering through one of the inlets. First and second throttling means is each associated with one of the inlets and each movable between a first and a second position one of which is an open position and the other of which is a closed position respectively permitting and preventing airflow through the associated inlet into the chamber. Finally, I provide operating means controlling the operation of the throttling means. This operating means includes a first and a second component which are each shiftable relative to the other between two terminal locations. The first component is associated with the first throttling means and the second component is associated with the second throttling means and the operating means is so constructed and arranged as to effect, in response to shifting of one of the components relative to the other component from one to the other of the terminal locations thereof, movement of the associated throttling means from the first to the second position thereof while maintaining the throttling means associated with the other component in the second position, and vice versa.

It is clear that I provide a single operating means which controls both the first and the second throttling means, and hereafter this operating means will be identified as the setting device which may include an electromotor or a hydraulically or pneumatically operated cylinder and piston arrangement, or the like. The importance of the invention resides in the fact that the setting device has two setting modes with the first component of the setting device bearing upon a stationary abutment when the setting device is in the first operative mode and the second component of the setting device bearing upon a stationary abutment when the setting device is in the second operative mode, with the respectively associated throttling means being maintained in closed position, so that in the first operative mode only the second throttling means and in the second operative mode only the first throttling means is movable between its open and closed position while the respectively other throttling means is maintained in closed position.

The air conditioner constructed in this manner is particularly simple and therefore of course relatively inexpensive; it is highly reliable in its operation, and it provides for very reliable and favorable regulation of the heating and cooling functions, precluding entirely the possibility of overlapping of these functions in the aforementioned undesired manner.

The throttling means may be of any suitable construction, for instance in form of turnable flaps or valve members, of sliding members, or the like. This is also true, as pointed out above, of the setting device as long as the latter comprises two components each of which is shiftable relative to the other between two terminal locations. Of course, the shifting of the components must be controllable by means of a suitable regulating and sensing device, for instance a thermostat. Particularly well suited for the setting device are constructions having linearly shiftable components, such as hydraulically operated or pneumatically operated cylinder and piston arrangements. However, electromotors and such members as screw spindles or racks driven by the electromotors in suitable manner, such as via a gear arrangement, can also be utilized.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

Description of the preferred embodiments

Figure 1:
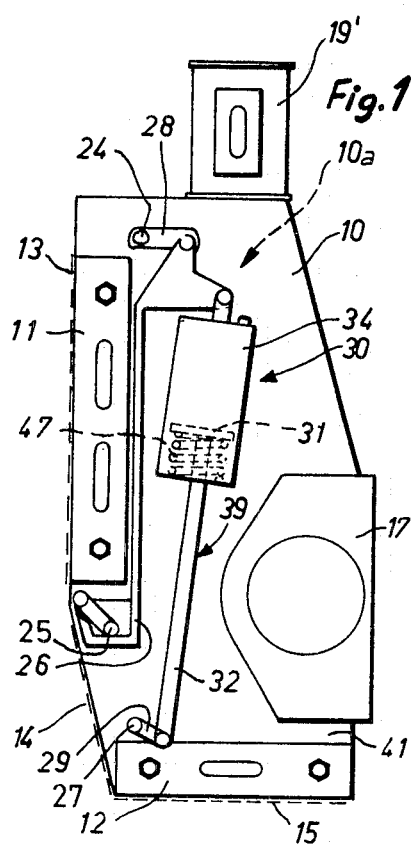
FIG. 1 is a side-elevational view of an air conditioner incorporating one embodiment of my invention, with certain non-essential components being omitted for clarity and the showing being in somewhat diagrammatic form.

Common to all figures of the drawing is the fact that identical components are identified in all figures with identical reference numerals. Furthermore, in all figures the device is illustrated in diagrammatic form and certain non-essential components which are known or which can be constructed in any desired manner, have been omitted for the sake of clarity, or have been shown only in diagrammatic form.

Discussing now the drawing in detail, and firstly the embodiment shown in FIGS. 1–7 thereof, it is to be understood that this air conditioner is of the induction type, that is the type where a secondary flow of air is injected into an internal chamber of the air conditioner through nozzles and at high speed and thereby induces, by virtue of a suction effect created, the flow of a larger amount of primary air into the device which admixes with the secondary air. However, this is shown only by way of example because the invention is by no means limited to this particular construction. Also, the air conditioner in FIGS. 1–7 is intended for installation in individual rooms, for instance in a wall recess arranged below a window, and it may be used in conjunction with a high-pressure system operating on the four-conductor or three-conductor principle.

The housing means is identified with reference numeral 10 and may consist in conventional manner of sheet metal. It is provided with an internal chamber 10a and with two air inlet channels 8, 9 (compare FIG. 3) in each of which there is arranged a heat exchanger 11 or 12. It will be seen that the heat exchangers 11, 12 are arranged approximately at right angles to one another, although this is of course not essential, and the heat exchanger 11 is assumed to be provided for air cooling purposes and may be cooled with cold water and the heat exchanger 12 may be heated with hot water and is assumed to be provided for air heating purposes.

Figure 5:
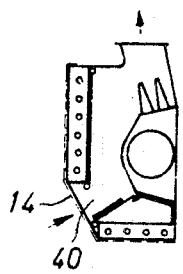
FIG. 5 is a view similar to FIGS. 3 and 4 but illustrating the device in a mode in which neither cooling nor heating of air takes place.

The device as provided in the illustrated embodiment with three inlet openings each of which has associated therewith, a filter, respectively identified with reference numerals 13, 14 and 15, and with an air outlet 19 in form of an outlet conduit having an outlet portion 19' through which the conditioned air, consisting of the admixed primary air and secondary air, is ejected into the room which is to be served by the air conditioner. It will be clear that air passing through the filter 13 and the associated inlet will move into contact with the heat exchanger 11 to be cooled thereby, that the air passing through the filter 15 and the associated inlet opening will move into contact with the heat exchanger 12 and be heated thereby, and that air passing through the filter 14 and the associated inlet opening will pass neither into contact with the heat exchanger 11 nor the heat exchanger 12 and will therefore not be conditioned at all except to be filtered. In other words, air entering through the filter 14 will move through a bypass which in FIG. 5 is identified with reference numeral 40. A chamber 17 constitutes the inlet for the initial air stream which to effect induction of inflow of additional air, and the nozzles 18 communicate with the chamber 17 as well as with the chamber 10a so that air can be injected into the latter from the former at high speed. This is of course already known.

Figure 3:
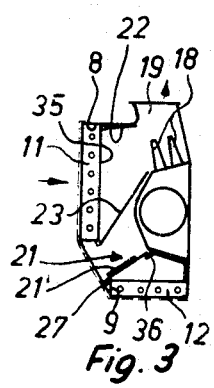
FIG. 3 is a section taken on the line A—A of FIG. 2, with certain components again being omitted for clarity and in somewhat diagrammatic view, illustrating the device of FIGS. 1 and 2 in the "maximum cooling" mode.
Figure 4:
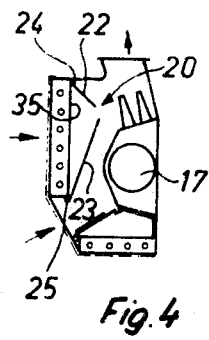
FIG. 4 is a view similar to FIG. 3 but illustrating the device in a "partial cooling" mode.

The present invention is directed to controlling the flow of incoming air which passes through the filters 13, 14 and 15. For this purpose throttling means 20, 21 are associated with the respective heat exchangers 11, 12. In the embodiment of FIGS. 1–7 the throttling means 20 is constructed in form of two throttling flaps 22, 23 which are rigid with shafts 24, 25, as seen in FIGS. 3 and 4, and the shafts 24, 25 extend with respective end portions through the side wall 41 (see FIG. 2) and are there coupled by a rod 26 in such a manner that they may be continuously moved in unison to opened or closed position. The throttling means 21, on the other hand, comprises a throttling flap 21' which is rigid with a shaft 27 an end portion of which also extends outwardly through the side wall 41 of the housing 10.

A lever 28 is rigidly connected with that end portion of shaft 24 which extends outwardly through the side wall 41, and another lever 29 is similarly connected with the end portion of the shaft 27 extending outwardly beyond the side wall 41. In accordance with the invention the free ends of the levers 28 and 29 are coupled with a setting device which is identified with reference numeral 30 in FIG. 1. This setting device in the illustrated embodiment is a single-acting pneumatically operated cylinder-and-piston arrangement whose cylinder is identified with reference numeral 34 and constitutes a first component, and whose piston 31 with piston rod 32 constitutes a second component which is identified with reference numeral 39. The two components 34, 39 are shiftable relative to each other and connected with the throttling means.

As seen particularly clearly in FIG. 3, the abutment surfaces 35, 36 for the throttling flaps 21', 22 and 23 serve not only to seal the respective passages when in engagement with the associated throttling flaps, but also serve as abutments or bearings for the components 34, 39. The arrangement of the abutment surfaces 35, 36 is such, as seen in FIGS. 3–7, that they will limit the movements of the throttling flaps 21', 22 and 23 in a given direction of adjustment of the setting device 30. Abutment is enhanced in this illustrated embodiment by a mechanical biasing action which in this embodiment results from the weight of the setting device 30 itself.

In operation of the air conditioner shown in FIGS. 1–7, a pressure fluid is introduced in known manner into the interior of the cylinder 34 of the setting device 30. The quantity of pressure fluid admitted is controlled by a non-illustrated thermostat capable of sensing the temperature of the air in the room which is to be conditioned, and this thermostat which may be of any well known construction, is capable of varying the quantity of pressure fluid admitted into the interior of the cylinder 34. Thus, the quantity of pressure fluid admitted into the cylinder 34 automatically adjusts in dependence upon the setting of the thermostat so that, independently of ambient temperature outside of the room to be conditioned, the air in the room is maintained at the desired temperature so the heating or cooling action of air aspirated from the room through one of the openings protected by the filters 13, 14 or 15 and returned into the room in conditioned state through the outlet conduit 19'.

A spring 47 counteracts the pressure of pressure fluid in the interior of cylinder 34 by acting upon the piston 31 so that the position of the latter is always dependent on the pressure of fluid in the cylinder 34. In FIG. 1, I have illustrated one terminal position of the setting device 30 wherein the throttling flap 21' is closed (compare FIG. 3) so that the stationary abutment face 36 which is associated with the throttling flap 21' constitutes a bearing not only for the latter but also for the component 39 which is articulately connected with the throttling flap 21'. In this setting the cylinder 34 is in an upper terminal position in which the throttling flaps 22 and 23 are both fully opened as seen in FIG. 3. In this setting, therefore, there is no obstruction to the flow of air through the opening protected by the filter 13 and consequently through and/or past the cooling device 11 so that the air conditioner operates in a "maximum cooling" mode.

If the pressure of fluid in the cylinder 34 decreases in response to a corresponding signal from the non-illustrated thermostat, the cylinder 34 will move downwardly as seen in FIG. 1 because of the biassing action of the spring 47. As this occurs, the throttling flaps 22 and 23 will increasingly move towards a closed position in which they will abut against the abutment face 35. With increasing movement of the flaps 22, 23 towards closed position the cross-sectional area of the inlet associated with the cooling device 11 decreases and less and less air can flow therethrough and into the chamber 10a. As this occurs, the flap 21' remains, however, in closed condition as shown in FIG. 4. Finally, the flaps 22 and 23 will be in closed condition and the flap 21' will also be in closed condition, and the dvecie will now be in the mode illustrated in FIG. 5 where air can only enter through the filter 14 and the opening associated therewith, and will thus pass through the bypass 40 without undergoing any conditioning, that is without being either heated or cooled.

Figure 6:
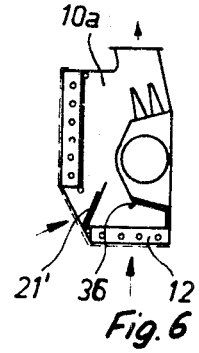
FIG. 6 is a view similar to FIGS. 3–5 but illustrating the device in a "partial heating" mode.
Figure 2:
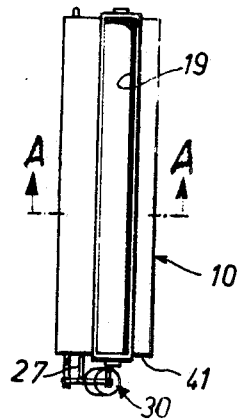
FIG. 2 is a top-plan view of FIG. 1.
Figure 7:
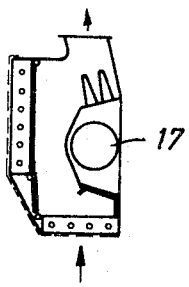
FIG. 7 is a view similar to FIGS. 3–6 but illustrating the device in a "maximum heating" mode.

If the pressure in the interior of cylinder 34 continues to decrease still further, the cylinder 34 can no longer move further downwardly because the throttling flaps 22, 23 now abut against their associated abutment face 35 which also serves as a bearing or abutment for the cylinder 34 as will be readily appreciated. In this position the flaps 22, 23 are maintained in abutment with the abutment face 35 by the weight of the setting device 30 itself. It will be appreciated, however, that suitable balancing means may be provided, for instance in the form of the spring or springs, which can take over this function. In any case, continued decrease of fluid pressure in the interior of the cylinder 34 will result, the levers 26, 28 being maintained in their position as before, in upwards movement of the piston 31 with piston rod 32 which together constitute the second component. This, in turn, results in movement of the flap 21' towards its open position as shown in FIG. 6. With the flap 21' being partly or completely opened (for the latter compare FIG. 7) air is aspirated in the direction of the arrows shown in FIGS. 6 and 7 through the opening associated with the heating device 12 and is heated so that the air conditioner now serves to heat the air. The heating effect per unit volume of inflowing air decreases of course as the flap 21' continues to open. However, while the heating effect per unit volume of air decreases, the increase in the throughput of air results in an overall increase in the heating effect provided by the device.

It will be seen that the embodiment of FIGS. 1–7 utilizes the flaps which control the heating and cooling action of the air conditioner for controlling also the cross-sectional area of the bypass 40, and this control is in a sense opposite to the change of the cross-sectional areas of the openings associated with cooling and heating devices 11, 12. In other words, as the cross-sectional areas of the passages associated with these devices increase, the cross-sectional area of the bypass 40 decreases.

It will be appreciated that instead of the two flaps 22, 23 associated with the device 11, a single such flap or more than two of the flaps may be utilized and that sliding members or other throttling means may be substituted for the flaps, depending on structural preferences, availability of space and other factors.

It will also be appreciated that in place of the weight of the setting device 30 itself, or in place of a biassing spring or springs, the abutment of the respective flaps with their associated abutment surfaces may be effected by the combilned action of the weight of the device 30 and additional springs, or that suitable weighting means may be substituted for either or both. Also, it is possible to utilize an arresting arrangement which will arrest the respective flaps in their abutting positions, and this arresting arrangement may be controlled by the movement of the respective component of the device 30 itself, for instance via limit switches which cooperate with an electromagnetic device capable of actuating the arresting arrangement. Similarly, such an arrangement may be utilized for arresting the movement of that one of the components which is not currently undergoing shifting, so that the arresting arrangement will substitute as a bearing in place of the abutments described above.

With the embodiment illustrated in FIGS. 1–7 the two operative modes of the setting device 30 preclude any possibility of overlapping of the heating and cooling functions and provide the additional third function illustrated in FIG. 5 where neither heating nor cooling takes place and air is simply circulated through the device. It is, clearly, also possible to eliminate this third operative mode and to provide for only two settings for which air is respectively heated or cooled.

Figure 8:
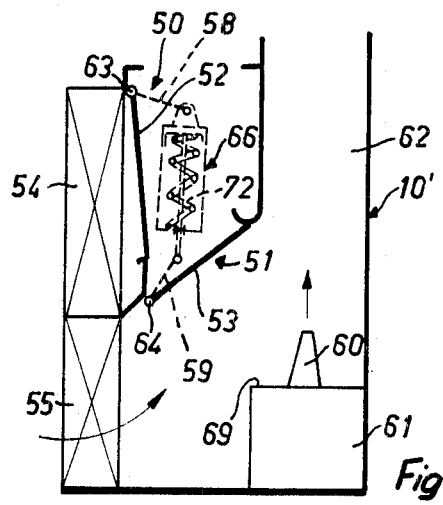
FIG. 8 is another diagrammatic view through an air conditioner according to a further embodiment of the invention, with certain components again being omitted for clarity and with the device being shown in a "maximum heating" mode.
Figure 10:
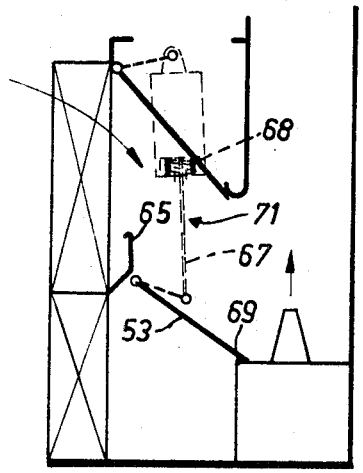
FIG. 10 is a view similar to that of FIGS. 8 and 9 but showing the device in a "maximum cooling" mode.
Figure 9:
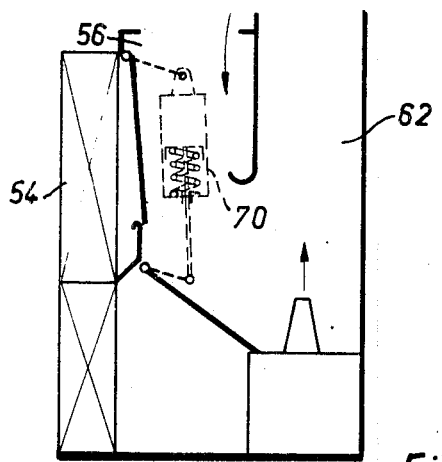
FIG. 9 is a view similar to FIG. 8 but showing the device in an intermediate mode corresponding to that shown in FIG. 5 of the preceding embodiment.

Coming now to the embodiment illustrated in FIGS. 8–10 it will be seen that here the housing means is identified with reference numeral 10', the chamber 61 corresponds to the chamber 17 of FIG. 1, the nozzle 60 corresponds to the nozzles 18 of FIG. 3, and the mixing and outlet conduit is identified with reference numeral 62. Two heat exchangers are again provided, and the one identified with reference numeral 54 is assumed to provide a cooling function while the one identified with reference numeral 55 is assumed to provide a heating function. It need not be emphasized that this could be reversed. A channel 56 serves as a bypass corresponding to the one identified with reference numeral 40 in FIG. 5, and is here located intermediate the heat exchanger 54 and the conduit 62.

The housing means 10' is closed completely except for the inlet openings associated with the heat exchangers 54 and 55 and with the air outlet communicating with the room whose air is to be conditioned.

The throttling means in this embodiment are identified with reference numerals 50 and 51 and each comprise only a single throttling flap 52 and 53, respectively. The flap 52 is rigid with a shaft 63 and the flap 53 is rigid with a shaft 64, each of which has an end portion extending through a side wall of the housing means 10′ in the manner shown in FIG. 1 but not illustrated in the embodiment of FIGS. 8–10. Levers 58 and 59 are respectively associated with these end portions and a setting device 66, again constructed as a pneumatically operated device, is associated with the levers 58, 59 in the manner described with reference to the embodiment of FIGS. 1–7.

The operation of the air conditioner shown in FIGS. 8–10 is substantially similar to that of FIGS. 1–7. The setting device 66 is again fed with a pressure fluid whose quantity is regulated by a thermostat or analogous means, and if the pressure of the pressure fluid is at a minimum the piston of the device is in the upper position shown in FIG. 8 in which the flap 53 is fully open whereas the flap 52 abuts under the weight of the device 66 against its associated abutment face 65. This position corresponds to a "maximum heating" mode. As fluid pressure in the device 66 increases, the piston of the device 66 moves downwardly against the biasing action of the spring 72 associated with the device 66, and this results in progressive movement of the flap 53 to closure position until the setting shown in FIG. 9 is reached in which both of the throttling means are closed and the bypass 56 is fully opened. In this position neither heating nor cooling takes place.

If the pressure of pressure fluid in the device 66 still increases when the position of FIG. 9 is reached, the flap 53 continues to abut against the abutment face 69 which as will be appreciated, simultaneously forms a bearing for the component 71 of the device 66, which component consists of the piston 68 and the piston rod 67 of the device 66. For this reason, the cylinder 70 of the device 66 now moves in upward direction, resulting in movement of the flap 52 to open position until the operative mode shown in FIG. 10 is assumed, which corresponds to a "maximum cooling" mode.

Evidently, various modifications are possible, some of which have been outlined above, and all of these can be accomplished without departing from the concept and scope of the invention.

It will be understood that each of the elements described above, or two or more together, may also find a useful application in other types of constructions differing from the types described above.

While the invention has been illustrated and described as embodied in an air conditioner, it is not intended to be limited to the details shown, since various modifications and structural changes may be made without departing in any way from the spirit of the present invention.

What is claimed is:

1. An air conditioner comprising, in combination, housing means defining an internal chamber and having at least two inlets and an outlet communicating with said chamber and through which air to be conditioned can respectively enter and leave said chamber; heat exchange means including at least one cooling device and at least one heating device respectively arranged in the path of air entering through one of said inlets; first and second throttling means each associated with one of said inlets and each movable between a first and a second position one of which is an open position and the other of which is a closed position respectively permitting and preventing airflow through the associated inlet into said chamber; and operating means including a single drive having a first and a second component, said components being shiftable relative to each other between two relative locations, said first component being associated with said first throttling means and said second component being associated with said second throttling means, said operating means being constructed and arranged in such a manner as to effect, in response to shifting of said components relative to each other from one to the other of said relative locations, movement of the associated throttling means from said first to said second position thereof while maintaining the throttling means associated with the other component in the second position, and vice versa.

2. An air conditioner as defined in claim 1; and further comprising abutment means operatively associated with the respective throttling means and positioned so as to be engaged by and prevent continued movement of the respective throttling means in response to the associated component shifting to one of said locations.

3. An air conditioner as defined in claim 1; further comprising abutment means operatively associated with the respective throttling means and positioned so as to be engaged by and prevent continued movement of the respective throttling means in response to the associated component shifting to one of said locations; and wherein said operating means are constructed and associated with the respective throttling means in such a manner that shifting of said other component between said locations thereof is initiated in automatic response to said one component moving beyond said other location.

4. An air conditioner as defined in claim 1; further comprising abutment means operatively associated with the respective throttling means and positioned so as to be engaged by and prevent continued movement of the respective throttling means in response to the associated component shifting to one of said locations; and wherein said operating means are constructed and associated with the respective throttling means in such a manner that shifting of said other component between said locations thereof is initiated in response to said one component moving beyond said other location to a predetermined extent.

5. An air conditioner as defined in claim 2, said throttling means being biased into abutting engagement with the respectively associated abutment means.

6. An air conditioner as defined in claim 5, wherein said operating means are constructed and arranged for biasing said throttling means into abutting engagement with the associated abutment means under the influence of gravity.

7. An air conditioner as defined in claim 5, said throttling means being constructed and arranged so as to be biased into abutting engagement with the associated abutment means under the influence of gravity.

8. An air conditioner as defined in claim 5; and biasing means effecting biasing of said throttling means into abutting engagement with the associated abutment means.

9. A air conditioner as defined in claim 8, wherein said biasing means comprises spring means.

10. An air conditioner as defined in claim 2; and further comprising wall means defining at least two air guide channels within said housing means and each connecting one of said inlets with said chamber, said heating and cooling device each being located in one of said guide channels.

11. An air conditioner as defined in claim 10, wherein said throttling means is effective for increasing and decreasing the free cross-sectional area of each of said guide channels in dependence upon movement of the respective throttling means between said first and second positions thereof.

12. An air conditioner as defined in claim 11, at least one of said throttling means comprising at least one flap member mounted for turning movement in the respective guide channel between said first and second positions.

13. An air conditioner as defined in claim 11, at least one of said throttling means comprising at least two flap members mounted in the respective guide channel for turning movement between said first and second positions in which they together permit and prevent airflow through said channel.

14. An air conditioner as defined in claim 10, said housing means having an additional inlet and said wall means defining an additional air guide channel bypassing said two air guide channels and communicating with said additional inlet and said chamber; and wherein said throttling means are constructed and arranged for co-operating with said additional channel and for permitting airflow through said additional channel when preventing airflow through said two channels, said additional channel is closed when the first or the second throttling means is in its fully open position.

15. An air conditioner as defined in claim 2, said operating means comprising a hydraulically or pneumatically operable cylinder-and-piston arrangement.

16. An air conditioner as defined in claim 2, said operating means comprising an electromotor and a movable element movable by said electromotor.

17. An air conditioner as defined in claim 2, said throttling means comprising respective flaps mounted for turning movement about pivot axles; and wherein each of said components of said operating means is articulately connected with at least one such pivot axle.

18. An air conditioner as defined in claim 17; further comprising lever means connected with the respective pivot axles and articulately connected with the respective components of said operating means.

19. An air conditioner as defined in claim 17, at least one of said flaps having an engagement face constructed and arranged so as to engage the respectively associated abutment means in sealing relationship therewith and in response to shifting of the component associated with said one flap shifting to one of said locations.

References Cited

UNITED STATES PATENTS

| | | | |
|---|---|---|---|
| 2,828,110 | 3/1958 | Baker et al. | 165—103 |
| 3,193,000 | 7/1965 | Bressoud | 165—26 |
| 3,323,584 | 6/1967 | Serratto | 165—123 |

ROBERT A. O'LEARY, Primary Examiner

C. SUKALO, Assistant Examiner

U.S. Cl. X.R.

165—122; 236—13